United States Patent
Liu

(10) Patent No.: US 9,295,361 B2
(45) Date of Patent: Mar. 29, 2016

(54) STOVE

(71) Applicant: Chia-Ming Liu, Dou-Lio (TW)

(72) Inventor: Chia-Ming Liu, Dou-Lio (TW)

(*) Notice: Subject to any disclaimer, the term of this patent is extended or adjusted under 35 U.S.C. 154(b) by 385 days.

(21) Appl. No.: 14/025,599

(22) Filed: Sep. 12, 2013

(65) Prior Publication Data

US 2014/0102434 A1    Apr. 17, 2014

(30) Foreign Application Priority Data

Oct. 11, 2012 (CN) .......................... 2012 1 0383089

(51) Int. Cl.
  *A47J 37/07*    (2006.01)
  *A23B 4/052*    (2006.01)
  *F24C 15/02*    (2006.01)
  *A23B 4/044*    (2006.01)

(52) U.S. Cl.
  CPC ............ *A47J 37/0704* (2013.01); *A23B 4/044* (2013.01); *A23B 4/052* (2013.01); *A47J 37/0786* (2013.01); *F24C 15/026* (2013.01)

(58) Field of Classification Search
  CPC .... A47J 37/0704; A47J 37/0786; A47J 37/07
  USPC ........... 126/25 R, 275 R, 273 A, 20; 219/720, 219/398; 99/339
  See application file for complete search history.

(56) References Cited

U.S. PATENT DOCUMENTS

| 2,003,059 | A  | * | 5/1935  | Teller     | F24C 15/16 126/337 R |
| 2,889,442 | A  | * | 6/1959  | Schultz    | F24C 7/08 126/19 M |
| 5,690,848 | A  | * | 11/1997 | Lamberti   | F24C 15/20 126/299 R |
| 7,069,924 | B2 | * | 7/2006  | Kuttalek   | F24C 15/162 126/273 R |
| 7,287,462 | B2 | * | 10/2007 | Dengler    | F24C 15/162 99/339 |
| 2007/0221199 | A1 | * | 9/2007 | Hake       | F24C 15/2021 126/299 R |
| 2014/0246008 | A1 | * | 9/2014 | Martin     | F24C 15/027 126/273 A |

FOREIGN PATENT DOCUMENTS

KR    2010062366 A * 6/2010 .............. A47J 37/06

* cited by examiner

*Primary Examiner* — Gregory Huson
*Assistant Examiner* — Nikhil Mashruwala
(74) *Attorney, Agent, or Firm* — Christensen O'Connor Johnson Kindness PLLC

(57) ABSTRACT

A stove for smoking and roasting food includes a stove unit having a top surface, a supporting frame disposed behind the stove unit, a cover unit disposed above the top surface, a guiding unit, and a cantilever unit. The cover unit has two joint connection portions on opposite sides thereof. The guiding unit has a pair of guiding elements disposed on the supporting frame and a pair of sliding elements disposed on the cover unit. The guiding elements cooperate with the sliding elements to guide and retain the cover unit during up-and-down movement thereof in a vertical direction. The cantilever unit interconnects the cover unit and the supporting frame for driving the cover unit to move with respective to the top surface.

6 Claims, 8 Drawing Sheets

STOVE

CROSS-REFERENCE TO RELATED APPLICATION

This application claims priority of Chinese Patent Application No. 201210383089.5, filed on Oct. 11, 2012, the disclosure of which is hereby incorporated by reference in its entirety.

BACKGROUND OF THE INVENTION

1. Field of the Invention

The invention relates to a stove, more particularly to a dual-function stove capable of smoking and roasting food with a vertically movable cover unit.

2. Description of the Related Art

A conventional stove, as disclosed by Taiwanese Patent No. M405238, includes a stove unit, a cover unit, two coupling seats disposed on opposite sides of the stove unit, and two connecting cantilever arms pivotally and respectively connecting the coupling seats to the cover unit such that the cover unit may be opened or closed with respect to the stove unit.

In the conventional stove, the cover unit is opened when food in the stove is insufficient or when the food has to be flipped over. The conventional stove is not suitable for smoking food due to difficulty in adjusting the vertical position of the cover unit.

SUMMARY OF THE INVENTION

Therefore, the object of the present invention is to provide a dual-function stove for smoking and roasting food, which has a cover unit that can be easily lifted or lowered.

Accordingly, there is provided a stove that includes:
a stove unit having a top surface, a stove frame that is disposed atop the top surface, and a heating unit that is disposed beneath the stove frame;
a supporting frame disposed behind the stove unit and extending along a vertical direction;
a cover unit disposed above the top surface of the stove unit and connected to the supporting frame, the cover unit having a pair of joint connection portions and an exhaust pipe;
a guiding unit having a pair of guiding elements that are disposed on the supporting frame and a pair of sliding elements that are disposed on the cover unit, the guiding elements cooperating with the sliding elements to retain up-and-down movement of said cover unit in the vertical direction; and
a cantilever unit pivotally connected between the supporting frame and the cover unit so as to drive the cover unit to vertically move with respect to the top surface.

By way of cooperation of the cantilever unit and the guiding unit, the cover unit can be easily driven to move with respect to the top surface of the stove unit while the dual functionalities of smoking and roasting food can be achieved.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
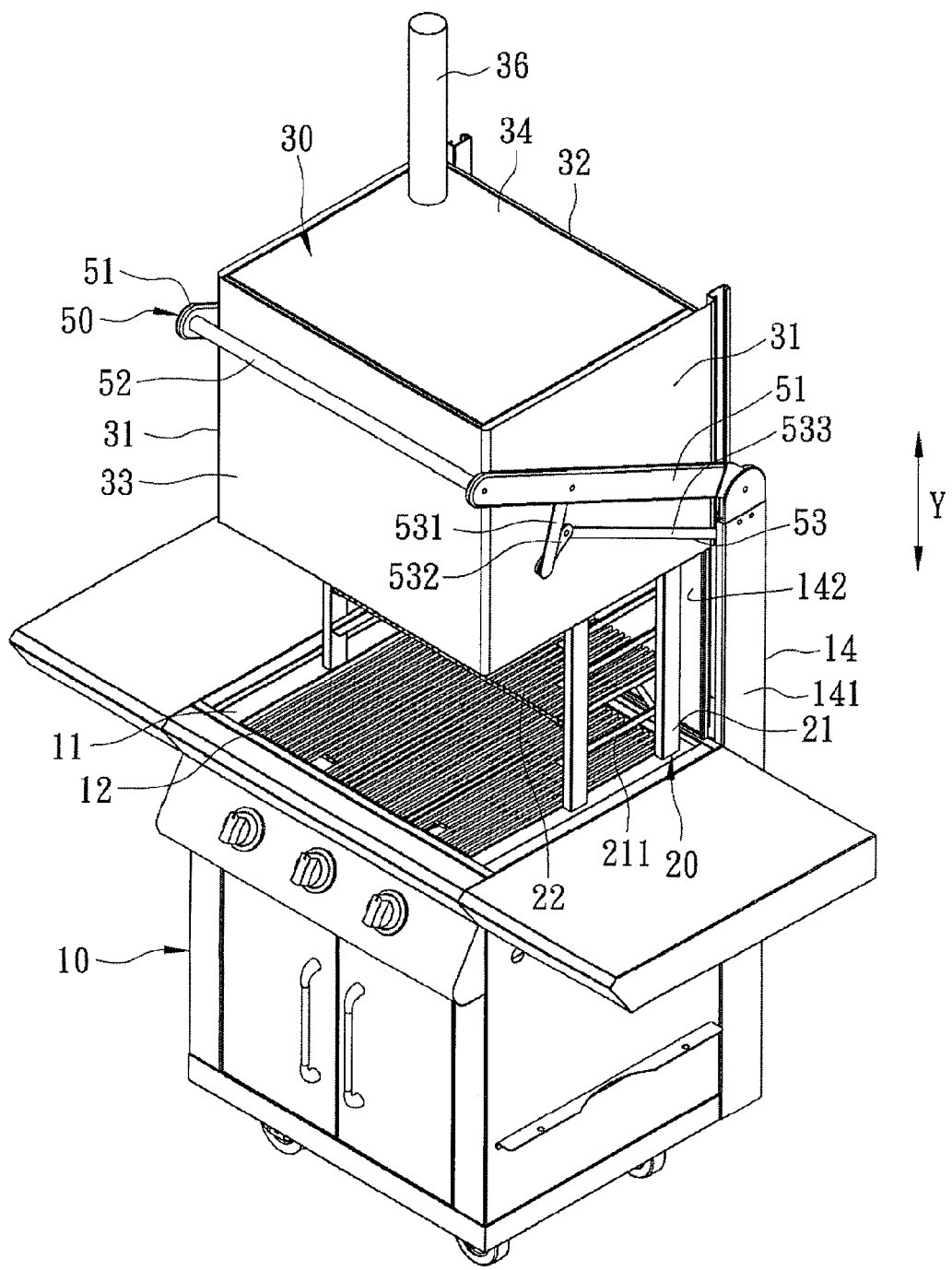
FIG. 1 is a perspective view of the preferred embodiment of a stove according to the present invention where a cover unit of the stove is in a lifted position.
Figure 2:
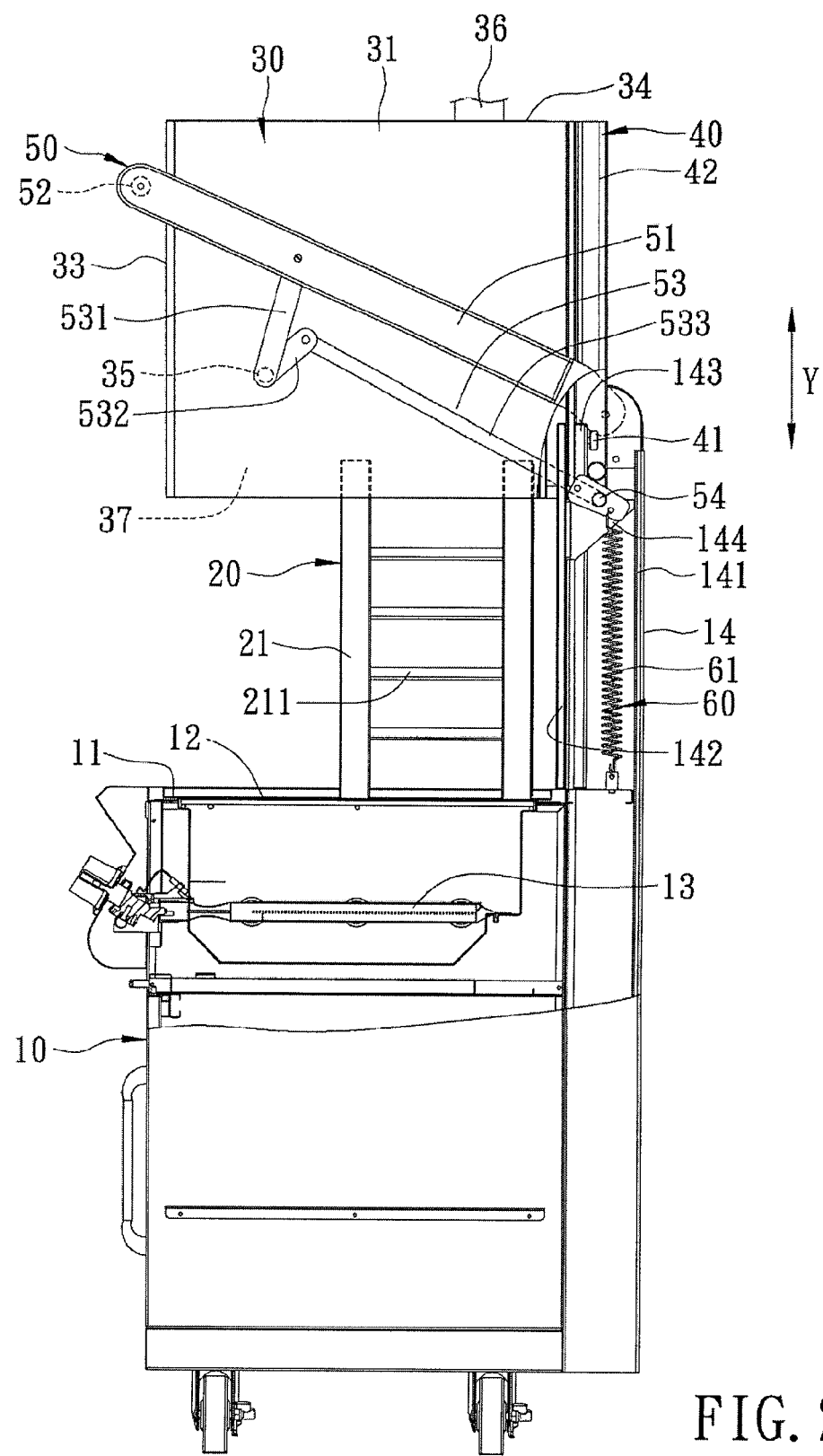
FIG. 2 is a fragmentary, partly-sectional view of the preferred embodiment.
Figure 3:
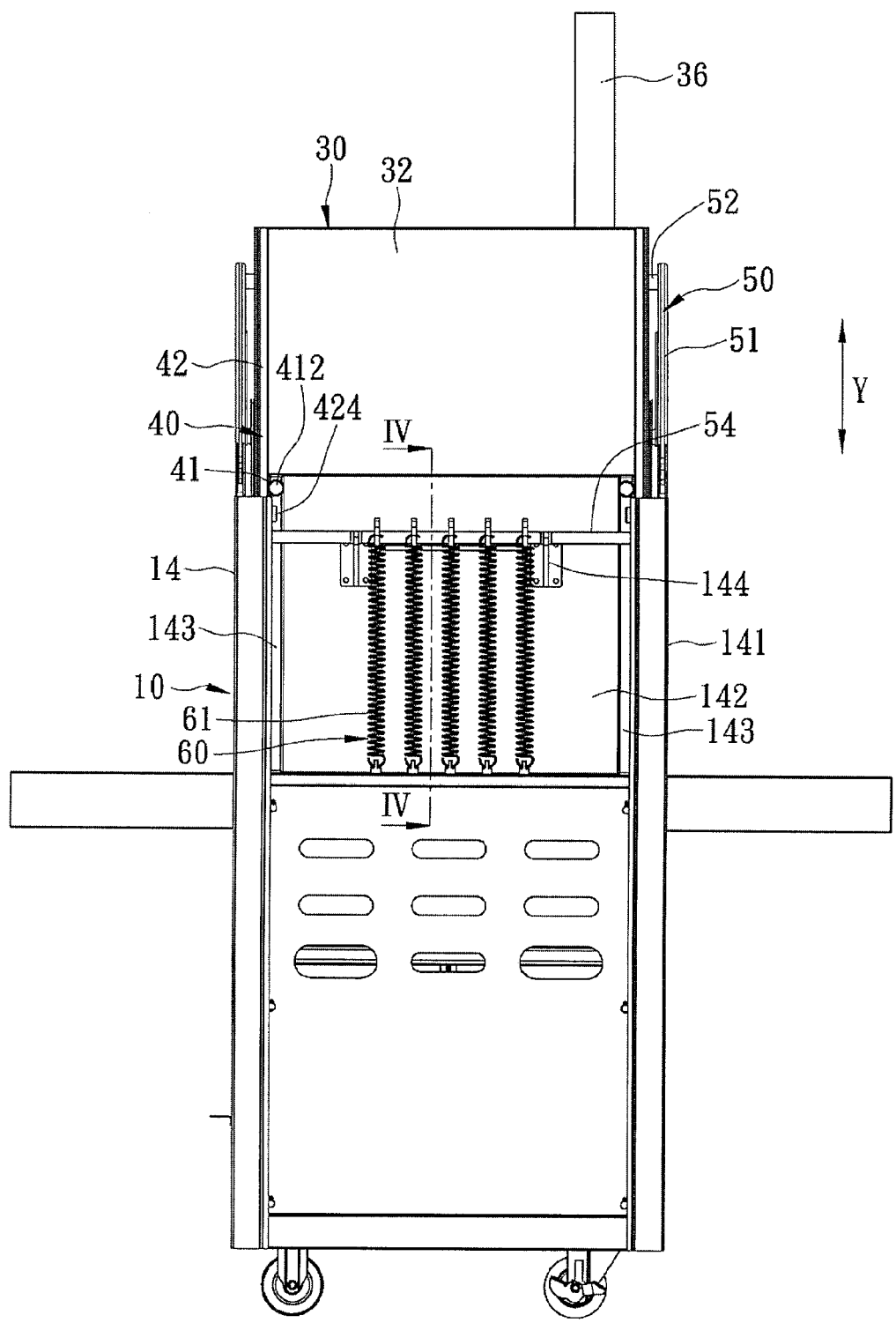
FIG. 3 is a rear view of the preferred embodiment.

With reference to FIGS. 1 to 3, the preferred embodiment of a stove of the present invention includes a stove unit 10, a shelf unit 20, a supporting frame 14, a cover unit 30, a guiding unit 40, a cantilever unit 50, and a restoring unit 60.

The stove unit 10 has a top surface 11, a stove frame 12 disposed atop the top surface 11, and a heating unit 13 disposed beneath the stove frame 12. The supporting frame 14 is disposed behind the stove unit 10 and extends along a vertical direction (Y). The supporting frame 14 has a pair of upright posts 141 extending in the vertical direction (Y), a back plate 142 disposed between the upright posts 141, a pair of guide posts 143 securely disposed on the back plate 142 and respectively abutting against inner sides of the upright posts 141, and a pair of spaced-apart pivot connectors 144 disposed on the back plate 142 between the upright posts 141.

The shelf unit 20 is disposed atop the top surface 11 of the stove unit 10 and can be accommodated within the cover unit 30. The shelf unit 20 has a pair of shelf frames 21 and at least one grid shelf 22 disposed between the shelf frames 21. Each of the shelf frames 21 has a plurality of cross rods 211 that are spaced apart from one another in the vertical direction (Y) for supporting the at least one grid shelf 22.

The cover unit 30 is disposed above the top surface 11 of the stove unit 10 and is connected to the supporting frame 14. The cover unit 30 includes a pair of side walls 31, and a rear wall 32 and a front wall 33 that are respectively interconnected between the side walls 31, with the rear wall 32 disposed adjacent to the back plate 142. A top wall 34 is disposed on and connected to the side walls 31, the rear wall 32, and the front wall 33. The cover unit 30 further includes a pair of joint connection portions 35 respectively disposed on the side walls 31, and an exhaust pipe 36 disposed on the top wall 34. The side walls 31, the rear wall 32, the front wall 33, and the top wall 34 cooperatively define a chamber 37 having a downward facing opening.

Figure 4:
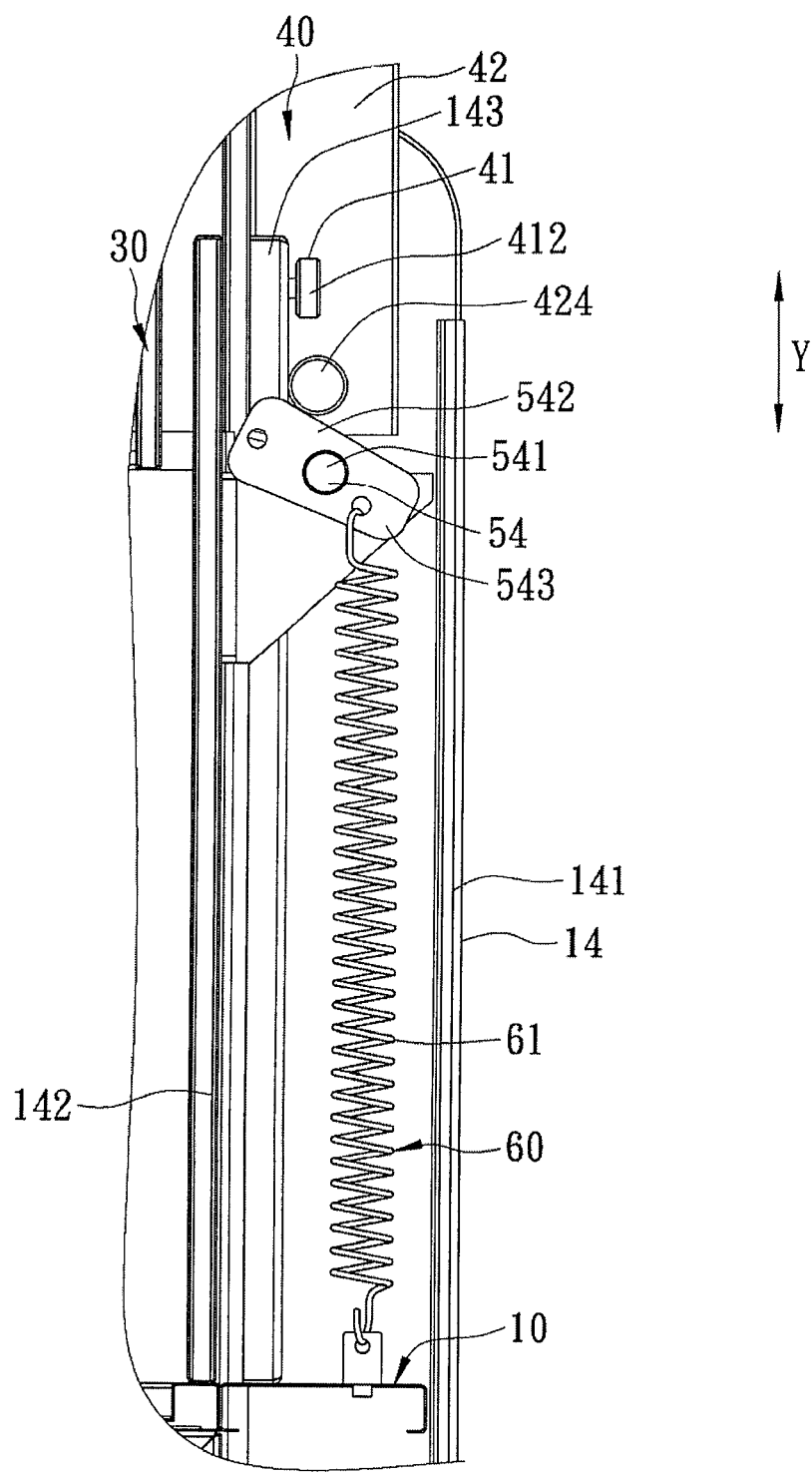
FIG. 4 is a fragmentary sectional view of the preferred embodiment, illustrating a guiding unit and a cantilever unit.
Figure 5:
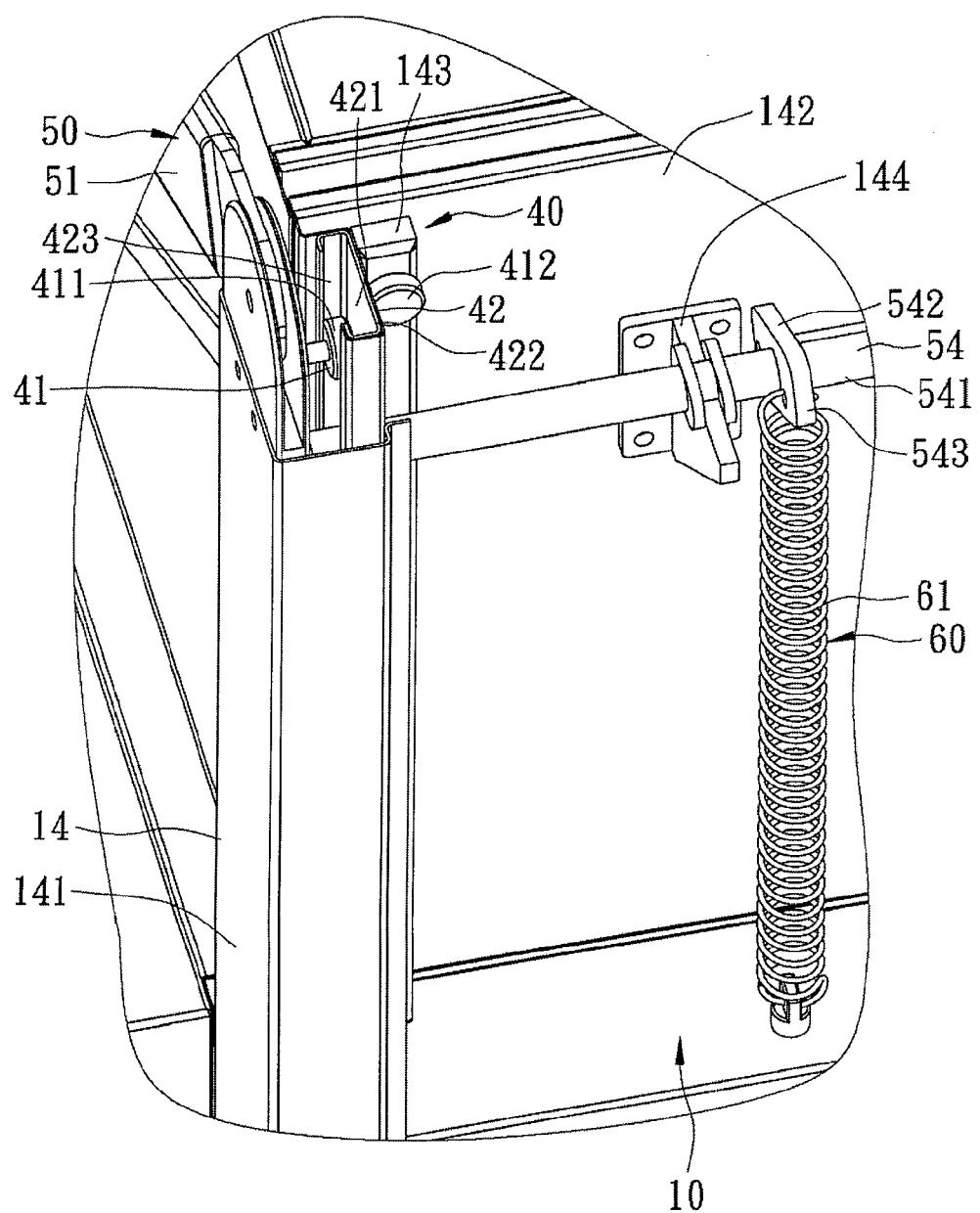
FIG. 5 is a fragmentary rear perspective view of the preferred embodiment.
Figure 6:
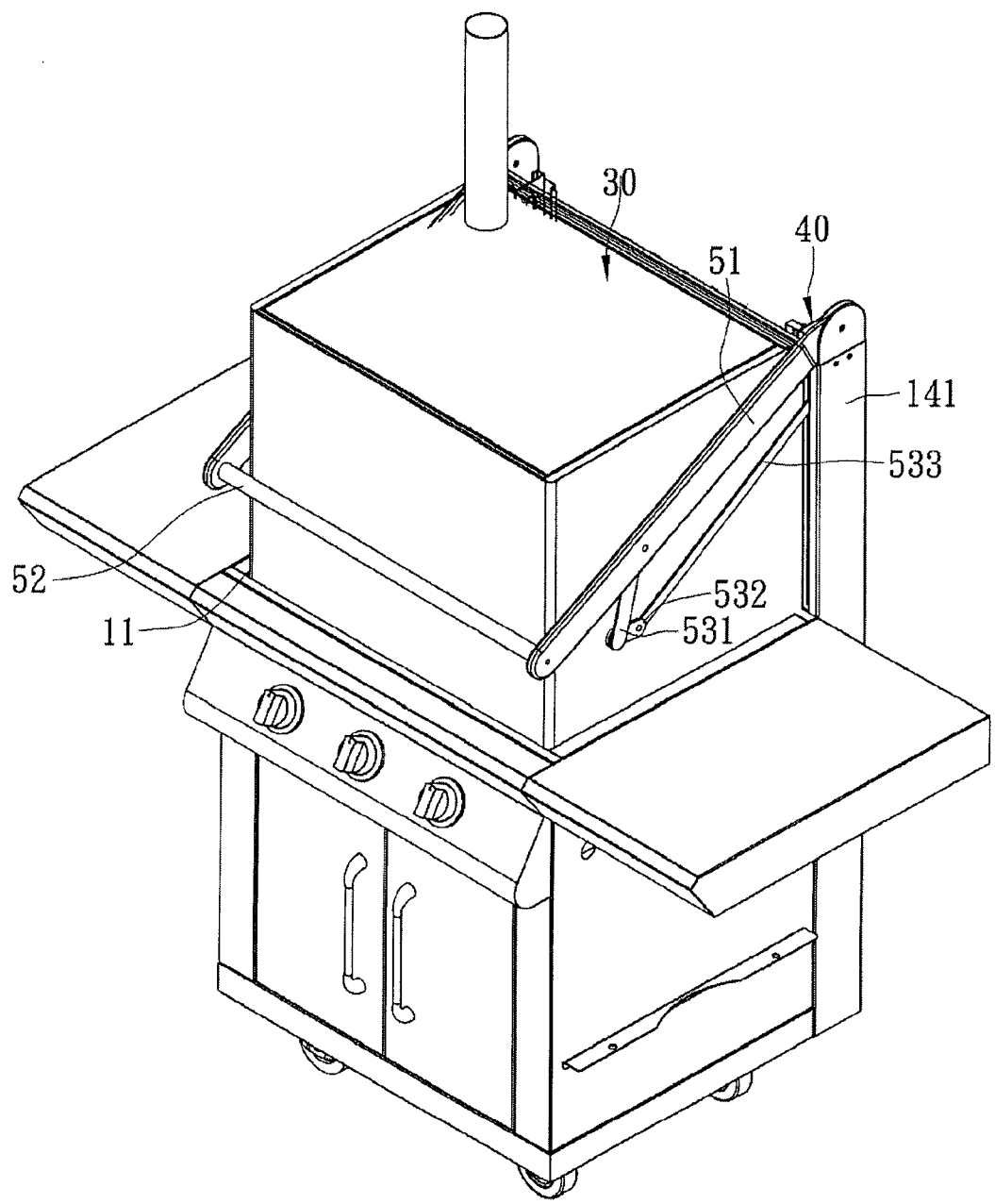
FIG. 6 is a perspective view of the preferred embodiment where the cover unit is in a lowered position.
Figure 7:
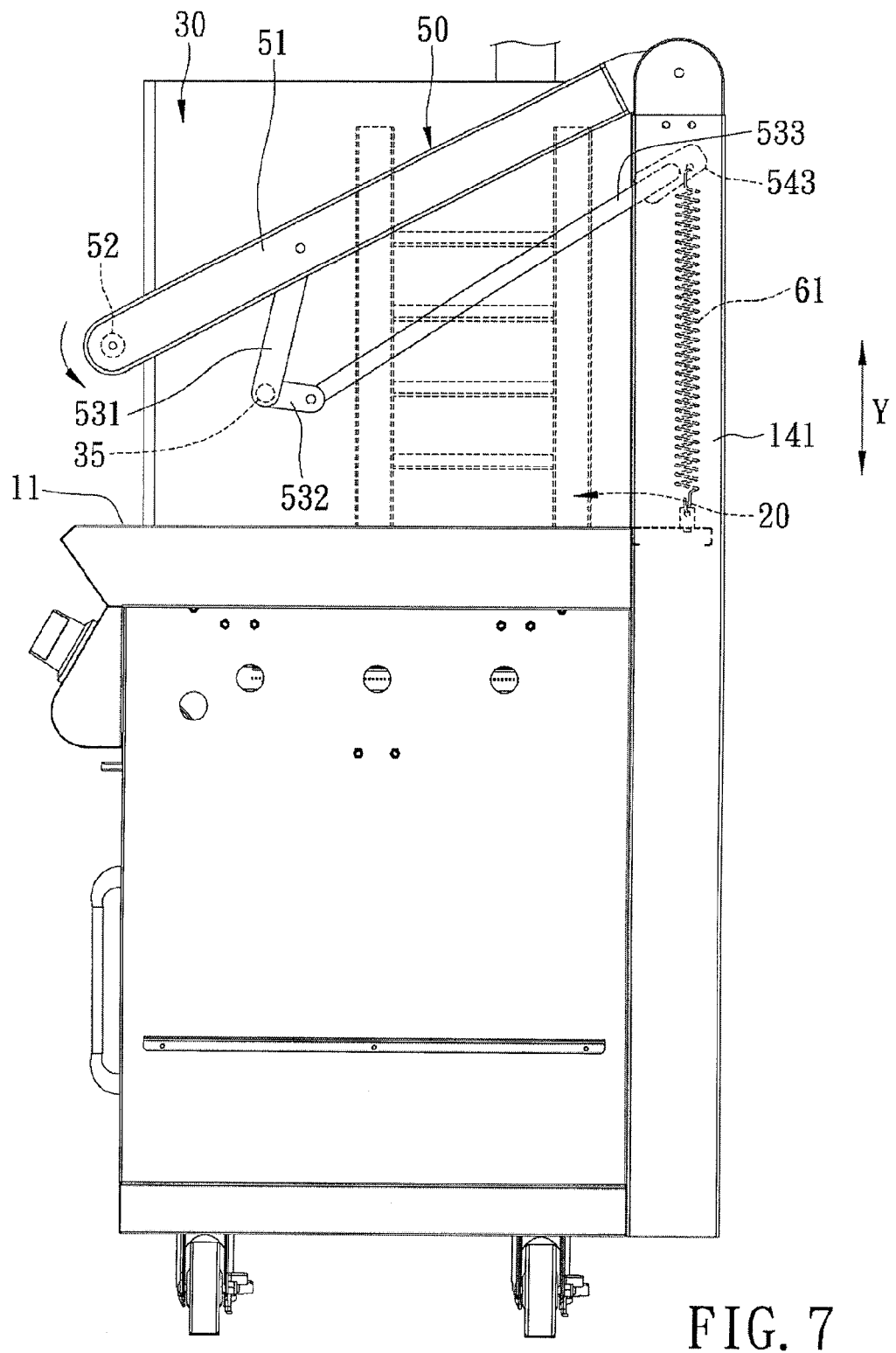
FIG. 7 is a fragmentary schematic view of the preferred embodiment, illustrating the cover unit at the lowered position.
Figure 8:
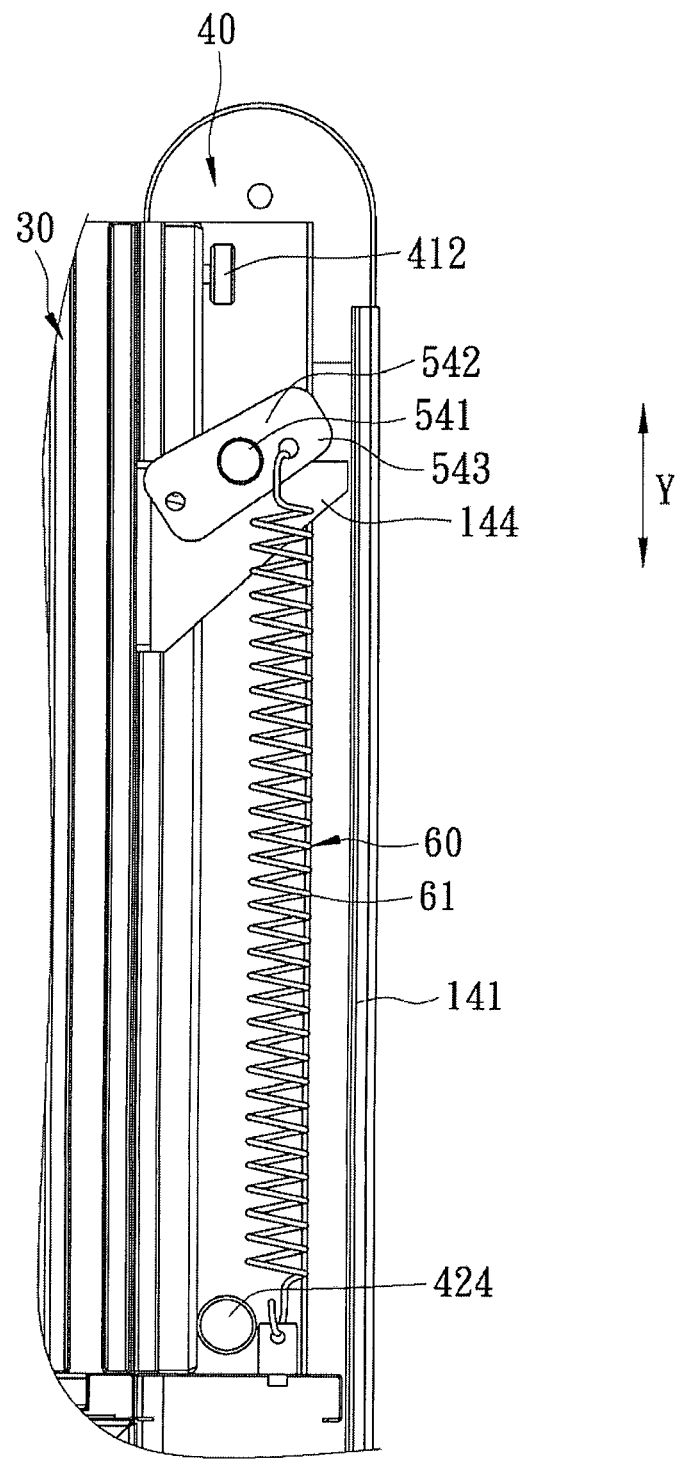
FIG. 8 is a fragmentary sectional view of the preferred embodiment, illustrating a link module of the cantilever unit.

With reference to FIGS. 4 and 5, where the cover unit 30 is in the lowered position. The guiding unit 40 includes a pair of guiding elements 41 (only one is shown) disposed on the supporting frame 14 and a pair of sliding elements 42 (only one is shown) disposed on the cover unit 30. The guiding elements 41 and the sliding elements 42 cooperate with each other to slide and retain the cover unit 30 during the up-and-down movement thereof in the vertical direction (Y). Each of the sliding elements 42 is rod-shaped, extends along the vertical direction (Y), and has a groove 421 and a surrounding wall 422 defining the groove 421 with a C-shaped section.

The surrounding wall 422 of each sliding element 42 has an opening 423 that communicates with the groove 421. The guiding unit 40 further includes a pair of guiding wheels 424 (only one is shown), each of which is disposed opposite to the opening 423 and that abuts against a corresponding one of the guide posts 143 of the supporting frame 14. Each of the guiding wheels 424 is rotatably disposed on a bottom portion of the surrounding wall 422 of the corresponding sliding element 42 when the cover unit 30 is in the lowered position. Each of the guiding elements 41 has a first roller 411 that is rotatably disposed on a top portion of the corresponding one of the upright post 141 and that is rotatably received in the groove 421 of the corresponding one of the sliding elements 42, and a second roller 412 that is rotatably disposed on the corresponding one of the guide posts 143 and that abuts against an outer surface of the corresponding one of the surrounding walls 422. The second rollers 412 of the guiding elements 41 are respectively disposed above the guiding wheels 424.

Referring back to FIGS. 1 to 3, the cantilever unit 50 is pivotally connected between the cover unit 30 and the supporting frame 14 so as to drive the cover unit 30 to move with respect to the top surface 11 of the stove unit 10. The cantilever unit 50 has a pair of cantilever arms 51 pivotally and respectively connected to the top portions of the upright posts 141 of the supporting frame 14, a handle 52 connected between the cantilever arms 51, a pair of link modules 53 (only one is shown) pivotally and respectively connected between the cantilever arms 51 and the cover unit 30, and a pivot axle unit 54 disposed on the supporting frame 14.

Each of the link modules 53 includes interconnected first, second, and third link rods 531, 532, 533, where the first link rod 531 is pivotally connected between a corresponding cantilever arm 51 and a corresponding joint connection portion 35 of the cover unit 30, the second link rod 532 is pivotally connected between the third link rod 533 and a corresponding joint connection portion 35, and the third link rod 533 is pivotally connected between the second link rod 532 and the pivot axle unit 54.

The pivot axle unit 54 includes a shaft 541 rotatably engaging the pivot connectors 144 and a plurality of spaced-apart positioning sheets 542 fixedly positioned along the shaft 541 and rotatable therewith. Each positioning sheet 542 has a moveable end 543 distant from the stove unit 10 (see FIG. 4).

The restoring unit 60 includes a plurality of restoring elements 61, each of which has opposite ends respectively connected to the stove unit 10 and the moveable end 543 of a corresponding one of the positioning plates 542 (see FIG. 4). The restoring elements 61 provide a restoring force that urges the stove unit 10 to move the cover unit 30 toward the top surface 11 of the stove unit 10. In this embodiment, the restoring elements 61 are extension springs.

With reference to FIGS. 1 and 2, when a user intends to place food on the stove frame 12 or to flip over the food placed on the stove frame 12, he/she may grasp the handle 52 of the cantilever unit 50 and lift it upwards, thereby causing the first link rods 531 to pivot with respect to the joint connection portions 35. Since the first, second, and third link rods 531, 532, 533 are interconnected, the second and third link rods 532, 533 are also driven to pivot, thereby lifting the cover unit 30 away from the top surface 11, as guided by the guiding unit 40 to reach the lifted position. In the lifted position, the cover unit 30 is distant from the top surface 11 of the stove unit 10 by a predetermined distance.

Referring to FIG. 4, the guiding elements 41 (only one is shown) and the sliding elements 42 (only one is shown) cooperate to guide and retain the cover unit 30, during the up-and-down movement thereof, and the restoring elements 61 (only one is shown) of the restoring unit 60 generate a restoring force against the pivoting movement of the moveable end 543 of the positioning plate 542. By virtue of the pivoting connections respectively between the cantilever arms 51 and the top portion of the upright posts 141, between the first link rods 531 and the joint connection portions 35, between the third link rods 533 and the pivot axles 54, and between the third link rods 533 and the second link rods 532 (see FIG. 2), the cantilever unit 50 further provides a supporting effect for the cover unit 30 so that the cover unit 30 will not move downward towards the top surface 11 of the stove unit 10 due to gravity. Hence, see FIG. 1, the user may stand close to the stove to roast or grill the food on the stove frame 12. The smoke thus generated is collected within the chamber 37 and vented out through the exhaust pipe 36.

With reference to FIGS. 5 to 8, when the user grasps the handle 52 and pulls it downwards, the cantilever arms 51 will respectively pivot with respect to the upright posts 141 and drive the cover unit 30 downward toward the top surface 11 of the stove unit 10 so that the food placed on the stove frame 12 (see FIG. 1) may be effectively smoked and roasted. As the handle 52 is being pressed downwards, the first and second link rods 531, 532 of each cantilever arm 51 will respectively pivot with respect to the joint connection portion 35, the second link rod 532 will drive the third link rod 533 to pivot, and the third link rods 533 will drive the shaft 541 of the pivot axle 54 to rotate with respect to the pivot connectors 144, thereby driving the moveable ends 543 of the positioning sheets 542 to rotate upwards. At this time, the restoring elements 61 (only one is shown) of the restoring unit 60 are extended by the pulling force respectively exerted thereon by the moveable ends 543 of the positioning sheets 542, thereby storing a restoring force for facilitating the next lifting operation of the cover unit 30.

Therefore, by using the cantilever unit 50 to drive the cover unit 30 to move up and down with respect to the top surface 11 of the stove unit 10 along the vertical direction (Y), the food can be conveniently roasted and smoked in the stove. When the cover unit 30 is lifted away from the top surface 11, there is sufficient space between the cover unit 30 and the top surface 11 to supply or flip over the food. When the cover unit 30 is close to the stove unit 10, the food on the stove frame 12 can be effectively smoked.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:
1. A stove comprising:
a stove unit having a top grilling surface, a stove frame disposed atop said top grilling surface, and a heating unit disposed beneath said stove frame;
a supporting frame disposed behind said stove unit and extending along a vertical direction;
a cover smoker unit disposed above said top grilling surface of said stove unit and connected to said supporting frame, said cover smoker unit having a pair of joint connection portions and an exhaust pipe;
a guiding unit having a pair of guiding elements that are disposed on said supporting frame and a pair of sliding elements that are disposed on said cover smoker unit, said guiding elements cooperating with said sliding ele- ments to guide and retain said cover smoker unit during up-and-down movement thereof in the vertical direction; and a cantilever unit pivotally connected between said supporting frame and said cover smoker unit so as to drive said cover smoker unit to vertically move with respect to said top grilling surface.

2. The stove of claim 1, further comprising a restoring unit that has a plurality of restoring elements, said restoring elements generating a restoring force that urges said cover smoker unit to move toward said top grilling surface of said stove unit.

3. The stove of claim 2, wherein said cantilever unit includes a pair of cantilever arms pivotally connected to said supporting frame, a handle connected to said cantilever arms, a pair of link modules and a pivot axle unit, each of said link modules having a first link rod that is pivotally connected between a corresponding one of said cantilever arms and a corresponding one of said joint connection portions of said cover smoker unit, a second link rod that is pivotally connected to the corresponding one of said joint connection portions of said cover smoker unit, and a third link rod that is pivotally connected between said second link rod and said pivot axle unit.

4. The stove of claim 3, wherein said pivot axle unit of said cantilever unit has a shaft and a plurality of positioning sheets that are spacedly and pivotally connected to said shaft, each of said positioning sheets having a movable end distant from said stove unit, each of said restoring elements being connected between said stove unit and said movable end of a corresponding one of said positioning sheets.

5. The stove of claim 1, further comprising a shelf unit disposed atop said top grilling surface of said stove unit and able to be accommodated within said cover smoker unit.

6. The stove of claim 1, wherein each of said sliding elements of said guiding unit extends in the vertical direction and is rod-shaped, each of said sliding elements having a groove and a surrounding wall that defines said groove, said surrounding wall being formed with an opening that communicates with said groove, said guiding unit further comprising two guiding wheels that are each disposed opposite to said opening of a corresponding one of said sliding elements and abutting against said supporting frame, each of said guiding elements of said guiding unit having a first roller disposed in said groove of a corresponding one of said sliding elements and a second roller that abuts against said surrounding wall outside of said groove.

* * * * *